(12) United States Patent
Shinohara

(10) Patent No.: US 7,345,830 B2
(45) Date of Patent: Mar. 18, 2008

(54) IMAGING LENS

(75) Inventor: Yoshikazu Shinohara, Saitama (JP)

(73) Assignee: Fujinon Corporation, Saitama - Shi, Saitama (JP)

( * ) Notice: Subject to any disclaimer, the term of this patent is extended or adjusted under 35 U.S.C. 154(b) by 0 days.

(21) Appl. No.: 11/402,833

(22) Filed: Apr. 13, 2006

(65) Prior Publication Data

US 2006/0238898 A1    Oct. 26, 2006

(30) Foreign Application Priority Data

Apr. 15, 2005  (JP)  ............... P.2005-118329
Mar. 30, 2006  (JP)  ............... P.2006-094746

(51) Int. Cl.
*G02B 9/34*   (2006.01)
*G02B 13/18*  (2006.01)
*G02B 3/02*   (2006.01)

(52) U.S. Cl. .................. 359/772; 359/715
(58) Field of Classification Search ........ 359/771–775, 359/715, 686–687
See application file for complete search history.

(56) References Cited

U.S. PATENT DOCUMENTS

| | | | |
|---|---|---|---|
| 4,606,607 A | 8/1986 | Kurihara | |
| 6,476,982 B1 | 11/2002 | Kawakami et al. | |
| 6,917,479 B2 | 7/2005 | Park et al. | |
| 2003/0184883 A1 | 10/2003 | Sato et al. | |
| 2004/0021957 A1 | 2/2004 | Isono | |
| 2004/0228009 A1* | 11/2004 | Kamo et al. | ............... 359/774 |
| 2004/0240080 A1 | 12/2004 | Matsui et al. | |
| 2006/0056068 A1 | 3/2006 | Lee et al. | |

FOREIGN PATENT DOCUMENTS

| | | |
|---|---|---|
| EP | 0105467 | 4/1984 |
| EP | 0716326 | 6/1996 |
| JP | 2004-102234 A | 4/2004 |
| JP | 2004-325713 | 11/2004 |
| JP | 2005-24889 A | 1/2005 |

* cited by examiner

*Primary Examiner*—Alicia M Harrington
(74) *Attorney, Agent, or Firm*—Birch, Stewart, Kolasch & Birch, LLP

(57) ABSTRACT

An imaging lens is provided and includes, in order from an object side of the imaging lens: a first lens of a positive lens; a second lens of a negative lens; a third lens of a bi-aspheric lens that has an image-side surface having an extreme point at a position other than an optical axis of the imaging lens; and a fourth lens of a bi-aspheric lens that has an object-side surface having an extreme point at a position other than the optical axis. The imaging lens satisfies Conditional Expressions specified in the specification.

31 Claims, 18 Drawing Sheets

IMAGING LENS

FIELD OF THE INVENTION

The present invention relates to a compact imaging lens including four lenses, and more particularly, to an imaging lens suitable for use as an image-capture lens in a PC or a portable terminal.

BACKGROUND OF THE INVENTION

A lens including three lens elements, where an aspheric lens for correcting an aberration is provided at a position closest to an image, has hitherto been known as an image-capture lens module incorporated in comparatively-slim equipment such as a simple digital camera, a WEB camera for a PC, a portable terminal, and the like.

However, imaging elements, such as CCDs, incorporated into the portable terminal have recently and rapidly moved toward higher-density packaging. Therefore, a lens module including four lens elements has become known so as to be compatible with higher-density packaging.

For instance, each of the imaging lenses disclosed in JP-A-2004-102234 and JP-A-2005-24889 includes four lens elements, wherein two aspheric lens elements for correcting aberrations are provided on the image side. By means of this configuration, it has become possible to attain optical performance compatible with imaging elements of higher-density packaging.

However, demand grows day by day for a further reduction in the thickness of the portable terminal such as that mentioned above. There also exists demand for a significant reduction in the overall length of the imaging lens used for the portable terminal. The imaging lenses described in JP-A-2004-102234 and JP-A-2005-24889 fail to address such demands.

SUMMARY OF THE INVENTION

An object of an illustrative, non-limiting embodiment of the present invention is to provide an imaging lens including four lens elements, whose overall length is shortened, and which can enhance optical performance, including a field curvature and chromatic aberrations, at least to a level at which the lens can be applied to a recent imaging element.

An imaging lens according to an exemplary embodiment of the present invention is characterized by comprising:

a first lens (a first lens element) of a positive lens;

a second lens (a second lens element) of a negative lens;

a third lens (a third lens element), both surfaces of which are aspheric surfaces, wherein an image-side surface of the third lens has an extreme point at a position other than an optical axis of the imaging lens; and a fourth lens (a fourth lens element), both surfaces of which are aspheric surfaces, wherein an object-side surface of the fourth lens has an extreme point at a position other than the optical axis, wherein the imaging lens satisfies conditional expressions (1) and (2):

$$R_{3R} > R_{4F} > 0 \quad (1)$$

$$PH_{3R} > PH_{4F} \quad (2)$$

wherein $R_{3R}$ represents a radius of curvature at the center of the image-side surface of the third lens;

$R_{4F}$ represents a radius of curvature at the center of the object-side surface of the fourth lens;

$PH_{3R}$ represents a distance (height) from the optical axis to the extreme point on the image-side surface of the third lens; and $PH_{4F}$ represents a distance (height) from the optical axis to the extreme point on the object-side surface of the fourth lens.

The term "extreme point" signifies an extreme point which exists next to an extreme point on the optical axis and at a position in a radial direction extending from the optical axis in the direction of an outer circumference. In the specification, when a lens shape is defined, the lens shape expresses a shape near the optical axis in principle.

In the above embodiment, the conditional expression (3) below is preferably satisfied:

$$v_{d2} < 35 \quad (3)$$

wherein $v_{d2}$ represents Abbe number of the second lens.

Further, the second lens is preferably a meniscus lens with a concave surface on an object side thereof.

Here, at least some of the conditional expressions (4) to (6) provided below are preferably satisfied:

$$0 < R_{4F} < R_{4R} \quad (4)$$

$$0 < R_{4F}/F < 0.5 \quad (5)$$

$$v_{d1} > 65 \quad (6)$$

wherein $R_{4R}$ represents a radius of curvature at the center of the image-side surface of the fourth lens;

F represents a focal length of the imaging lens (i.e., the entire lens system); and $v_{d1}$ represents Abbe number of the first lens.

Preferably, a diaphragm is interposed between the first lens and the second lens, and a conditional expression (7) is satisfied:

$$D_{A1-2} > D_{T1} \quad (7)$$

wherein $D_{A1-2}$ represents an on-axis air distance between the first lens and the second lens; and $D_{T1}$ represents an on-axis thickness of the first lens.

According to an imaging lens of the present invention, the first lens is imparted with a chief imaging function, and the third and fourth aspheric lenses are imparted with an aberration correction function.

The imaging lens is configured such that the curvature radius $R_{3R}$ at the center of the image-side surface of the third lens is made greater than the curvature radius $R_{4F}$ at the center of the object-side surface of the fourth lens and such that the distance (height) $PH_{3R}$ from the optical axis of the extreme point on the image-side surface of the third lens is made greater than the distance (height) $PH_{4F}$ from the optical axis of the extreme point on the object-side surface of the fourth lens. Specifically, the imaging lens is configured such that, by means of an air lens situated between the third and fourth lenses, the curvature radius at the center of the image-side surface becomes smaller than the curvature radius at the center of the object-side surface, and the height of the extreme point of the image-side aspheric surface becomes lower than the height of the extreme point of the object-side aspheric surface. As a result of the air lens existing between the two aspheric lenses being configured as above, the overall length of the lens system is significantly reduced, and the aberration correction function of the third and fourth lenses can be maintained superior. Particularly, the excellent characteristic of a field curvature can be ensured.

According to an imaging lens of the present invention, a deterioration in chromatic aberration, which is induced as a result of the lenses being increased in number to four, is compensated for by employment of a high-dispersion material for the second lens, thereby rendering chromatic aberration superior.

DETAILED DESCRIPTION OF THE INVENTION

Exemplary embodiments of the present invention will be described hereinbelow by reference to the drawings. In the description below, a power of a lens and a concavity and convexity of a lens surface are referred to as those on the optical axis in principle.

Figure 1:
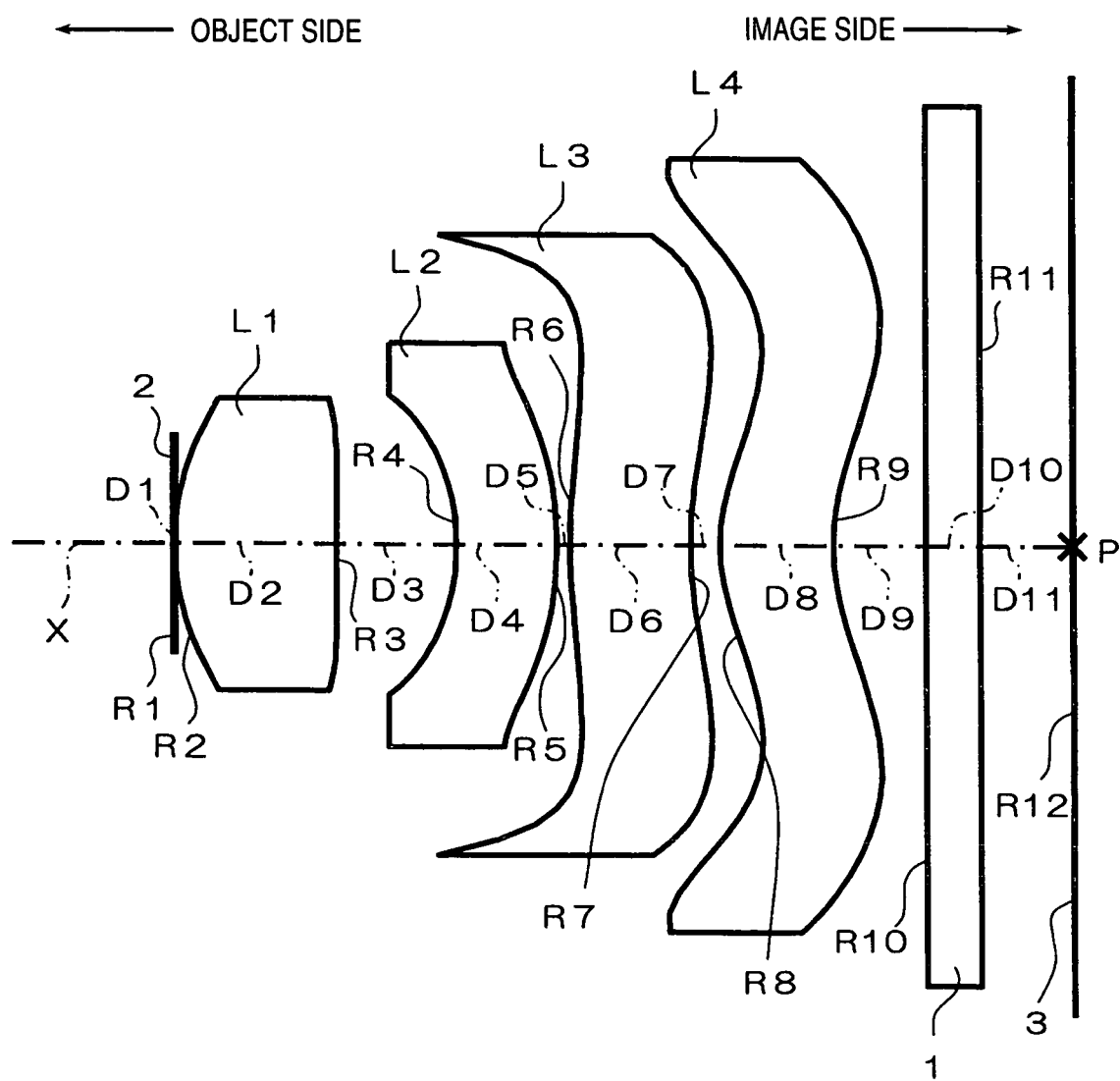
FIG. 1 is a schematic diagram showing the configuration of an imaging lens according to a first example of the present invention.

An imaging lens of an embodiment shown in FIG. 1 (an imaging lens of a first example is shown as a representative imaging lens) comprises, in order from an object side of the imaging lens: a first lens $L_1$ of a positive lens; a second lens $L_2$ of a negative lens; a third lens $L_3$, both surfaces of which are aspheric surfaces and an image-side surface of which has an extreme point at a position other than an optical axis of the imaging lens; and a fourth lens $L_4$, both surfaces of which are aspheric surfaces and an object-side surface of which has an extreme point at a position other than the optical axis. The imaging lens is arranged so as to efficiently focus a luminous flux, which enters along the optical axis X, to an imaging position P of the imaging element (an imaging plane) 3. Further, a diaphragm 2 is disposed on the object-side of the first lens $L_1$, and cover glass 1 is interposed between the imaging lens and the imaging element 3. Each example below is an embodiment in which the third lens $L_3$ is a positive meniscus lens and the fourth lens $L_4$ is a positive meniscus lens. The fourth lens L4 may be a negative meniscus lens. The second lens $L_2$ is preferably a meniscus lens with a concave surface on the object side thereof.

An aspheric shape of each lens surface is expressed by the following aspheric surface expression:

$$Z = \frac{Y^2/R}{1 + \sqrt{1 - K \times Y^2/R^2}} + \sum_{i=3}^{10} A_i Y^i$$

wherein Z represents a length of the normal to a tangential plane at the vertex of an aspheric surface (a plane perpendicular to the optical axis) from a point on the aspheric surface which is spaced from the optical axis by a distance Y;

Y represents a distance from the optical axis;

R represents a curvature radius of the neighborhood of the optical axis on the aspheric surface;

K represents an eccentricity; and

Ai represents an aspheric coefficient (i=3 to 10).

A working-effect of the present embodiment will now be described.

The positive power of the first lens $L_1$, among the four lenses, is made comparatively stronger, whereby the overall length of the lens can be reduced.

The third and fourth lenses $L_3$ and $L_4$ are aspheric lenses. Aberrations, including a field curvature and spherical aberration, can be corrected by means of providing two lenses each having such an aberration correction function.

An imaging lens of the present embodiment satisfies conditional expressions (1) and (2) below:

$R_{3R} > R_{4F} > 0$     (1)

$PH_{3R} > PH_{4F}$     (2)

wherein $R_{3R}$ represents a radius of curvature at a center of the image-side surface of the third lens;

$R_{4F}$ represents a radius of curvature at a center of the object-side surface of the fourth lens;

$PH_{3R}$ represents a distance from the optical axis to the extreme point on the image-side surface of the third lens; and $PH_{4F}$ represents a distance from the optical axis to the extreme point on the object-side surface of the fourth lens.

Conditional expression (1) signifies that an air lens located between the third lens $L_3$ and the fourth lens $L_4$ is configured such that the curvature radius at the center of the image-side surface of the air lens becomes smaller than the curvature radius at the center of the object-side surface of the air lens. Even when the overall length of the lens system is significantly reduced by means of satisfaction of conditional expression (1), the superior characteristic of the field curvature can be maintained. Namely, in a case where conditional expression (1) is not satisfied, when an attempt is made to shorten the overall length of the lens system, difficulty is encountered in correcting the field curvature.

Conditional expression (2) signifies that the air lens located between the third lens $L_3$ and the fourth lens $L_4$ is configured such that the height of the extreme point on the image-side aspheric surface becomes lower than the height of the extreme point on the object-side aspheric surface. As a result of conditional expression (2) being satisfied, even when the overall length of the lens system is significantly reduced, the superior characteristic of the curvature of a tangential image plane along the outer circumference can be maintained. Specifically, when conditional expression (2) is not satisfied and when an attempt is made to shorten the overall length of the lens system, difficulty is encountered in correcting the curvature of the tangential image plane.

The imaging lens of the present embodiment preferably satisfies conditional expression (3) below:

$$v_{d2} < 35 \quad (3)$$

wherein $v_{d2}$ represents Abbe number of the second lens.

As a result of conditional expression (3) being satisfied, chromatic aberration can be lessened. Specifically, when the upper limit of conditional expression (3) is exceeded, axial chromatic aberration becomes greater, to thus degrade resolution.

In the imaging lens of the present embodiment, more preferably, at least one of conditional expressions (4) to (6) below is satisfied.

$$0 < R_{4F} < R_{4R} \quad (4)$$

$$0 < R_{4F}/F < 0.5 \quad (5)$$

$$v_{d1} > 65 \quad (6)$$

wherein $R_{4R}$ represents a radius of curvature at the center of the image-side surface of the fourth lens;

F represents a focal length of the imaging lens (i.e., the entire lens system); and $v_{d1}$ represents Abbe number of the first lens.

The substance of conditional expression (4) lies in the curvature radius $R_{4R}$ at the center of the image-side surface being made smaller in connection with the curvature radii at the centers of both surfaces of the fourth lens $L_4$. As a result of conditional expression (4) being satisfied, the overall length of the curvature of the image plane can be shortened while the field curvature is corrected in an excellent manner. Specifically, when conditional expression (4) is not satisfied, shortening the overall length of the lens system becomes difficult.

The substance of conditional expression (5) lies in a value, which is determined by dividing the curvature radius at the center of the object-side surface of the fourth lens $L_4$ by the focal length of the entire lens system, being made smaller than 0.5. When conditional expression (5) is satisfied, the power of the fourth lens can be made greater while an aberration correction function is ensured. An attempt can be made to shorten the entire lens system.

The substance of conditional expression (6) lies in the first lens $L_1$ being formed from a glass material exhibiting a large Abbe number. Conditional expression (1) stipulates that the second lens $L_2$ is formed from a high-dispersion glass material. So long as the first lens $L_1$ is formed from a low-dispersion glass material by means of satisfying conditional expression (6), axial chromatic aberrations can be diminished further, and resolution can be enhanced.

In imaging lens of the embodiment, more preferably the following conditions are satisfied.

Specifically, a diaphragm 2 is interposed between the first lens $L_1$ and the second lens $L_2$, and the following conditional expression (7) is preferably satisfied (adopted in a third example to be described later).

$$D_{A1-2} > D_{T1} \quad (7)$$

wherein $D_{A1-2}$ represents an on-axis air distance between the first lens and the second lens; and $D_{T1}$ represents an on-axis thickness of the first lens.

As a result of such conditions being satisfied, a sufficient space used for placing a diaphragm mechanism can be ensured as axial air spacing existing between the first lens $L_1$ and the second lens $L_2$. Specifically, when conditional expression (7) is not satisfied, difficulty is encountered in ensuring a sufficient space used for opening/closing the diaphragm 2 or inserting a luminous energy variable mechanism.

In the imaging lens of the present embodiment, the two surfaces of an air lens existing between the third lens $L_3$ and the fourth lens $L_4$ are formed so as to run parallel to each other. The curvature radii at the centers of the third and fourth lenses assume positive signs (the lenses protrude toward the object). The present embodiment has been conceived as a result of finding that the field curvature can be maintained superior even when the overall length of the lens system has been reduced to essentially the same length as that of the lens system including three lens elements, by means of paying attention to the aspheric shapes of both surfaces of the air lens located between the third lens $L_3$ and the fourth lens $L_4$ and specifying, as mentioned above, the curvature radii at the centers of both aspheric surfaces and the heights of the extreme points on the aspheric surfaces.

An imaging lens of the present invention is susceptible to various modes. For instance, the curvature radii, lens intervals (or lens thicknesses), and shapes of the aspheric surfaces of the respective lenses can be changed as appropriate. The lens material is not limited to a glass material. Cost can be further curtailed by means of forming the lens from a plastic material. Preferably, an aspheric surface is formed on at least both sides of the third lens $L_3$ and those of the fourth lens $L_4$, and on both sides of the first lens $L_1$ and those of the second lens $L_2$ as well. As mentioned above, the aspheric surfaces are provided on the respective lens surfaces, whereby aberrations are corrected by use of the plurality of surfaces to thus enable an improvement in optical performance.

FIRST EXAMPLE

FIG. 1 shows a schematic configuration of an imaging lens according to a first example. The imaging lens is formed from a first lens $L_1$ of a positive meniscus lens whose convex surface is oriented toward the object; a second lens $L_2$ of a negative meniscus lens whose convex surface is oriented toward the image; and third and fourth lenses $L_3$, $L_4$, each of which is a positive meniscus lens and has aspheric surfaces, each of the aspheric surfaces having an extreme point at a position other than the neighborhood of the optical axis. Both surfaces of the first lens $L_1$ and those of the second lens $L_2$ are also made aspheric.

Table 1 shows, for each of the imaging lenses, a curvature radius R (mm) of the lens surface, the center thickness, an air spacing between the lens and another lens (hereinafter generically called an "axial surface separation) D (mm), a refractive index N, and an Abbe number ν achieved along a line "d" thereof. Numerals provided in the table show the sequence of surfaces from the object (the first surface is a diaphragm surface, and the twelfth surface is an imaging surface). In connection with the respective aspheric surfaces, Table 2 shows constants K, $A_3$, $A_4$, $A_5$, $A_6$, $A_7$, $A_8$, $A_9$, $A_{10}$ of aspheric surfaces provided in the aspheric expression. The focal length "f" of the entire lens system in the first example is set to 1.0 mm.

TABLE 1

|  | SURFACE NO. | R | D | Nd | νd |
|---|---|---|---|---|---|
| STO | 1 | ∞ | 0.00000 | | |
| | *2 | 0.3559 | 0.20958 | 1.468250 | 78.0 |
| | *3 | 6.2432 | 0.16540 | | |
| | *4 | −0.3413 | 0.13055 | 1.602929 | 28.0 |
| | *5 | −0.8857 | 0.01741 | | |
| | *6 | 0.5895 | 0.15644 | 1.508692 | 56.0 |
| | *7 | 0.6129 | 0.04784 | | |
| | *8 | 0.2826 | 0.14850 | 1.508692 | 56.0 |
| | *9 | 0.3040 | 0.12184 | | |
| | 10 | ∞ | 0.06962 | 1.516330 | 64.1 |
| | 11 | ∞ | 0.12094 | | |
| IMG | 12 | ∞ | | | |

*ASPHERIC SURFACE

TABLE 2

| SUR-FACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 2 | $7.233 \times 10^{-1}$ | $-4.976 \times 10^{-2}$ | 1.023 | $-1.037 \times 10$ | $1.018 \times 10$ | $1.220 \times 10^2$ | $1.970 \times 10^2$ | $-1.500 \times 10^3$ | $-1.700 \times 10^4$ |
| 3 | 1.000 | $-1.716 \times 10^{-1}$ | −1.290 | $-1.259 \times 10$ | $-3.078 \times 10$ | $2.356 \times 10^2$ | $1.102 \times 10^2$ | $-1.766 \times 10^4$ | $2.499 \times 10^4$ |
| 4 | 1.640 | −1.312 | $9.231 \times 10^{-3}$ | $3.928 \times 10$ | $-1.455 \times 10^2$ | $-8.684 \times 10^2$ | $2.401 \times 10^3$ | $3.611 \times 10^4$ | $-1.750 \times 10^5$ |
| 5 | −2.632 | −2.346 | $-1.844 \times 10$ | $1.090 \times 10^2$ | $2.804 \times 10$ | $-6.861 \times 10^2$ | $-8.552 \times 10^2$ | $5.757 \times 10^3$ | $2.847 \times 10^3$ |
| 6 | $-2.533 \times 10^{-1}$ | −2.029 | 6.589 | 2.914 | $-2.831 \times 10$ | $-2.024 \times 10^2$ | $2.090 \times 10^2$ | $2.525 \times 10^3$ | $-5.427 \times 10^3$ |
| 7 | $5.928 \times 10^{-1}$ | $-3.573 \times 10^{-1}$ | −6.054 | $-1.781 \times 10^{-1}$ | $2.027 \times 10$ | $-5.687 \times 10$ | $4.009 \times 10$ | $1.784 \times 10^2$ | $-4.734 \times 10^3$ |
| 8 | −6.293 | 1.211 | −5.793 | $-1.580 \times 10$ | 5.763 | $4.983 \times 10$ | $1.894 \times 10$ | −3.690x | $-1.782 \times 10$ |
| 9 | −3.869 | $4.703 \times 10^{-1}$ | −7.319 | $1.038 \times 10$ | $-1.746 \times 10$ | $-1.339 \times 10$ | $7.094 \times 10$ | $9.825 \times 10$ | $-2.293 \times 10^2$ |

The imaging lens of the first example satisfies all the conditional expressions (1) to (6) as shown in Table 13. The entire length of the lens system is assumed to be 1.19 mm.

Figure 2:
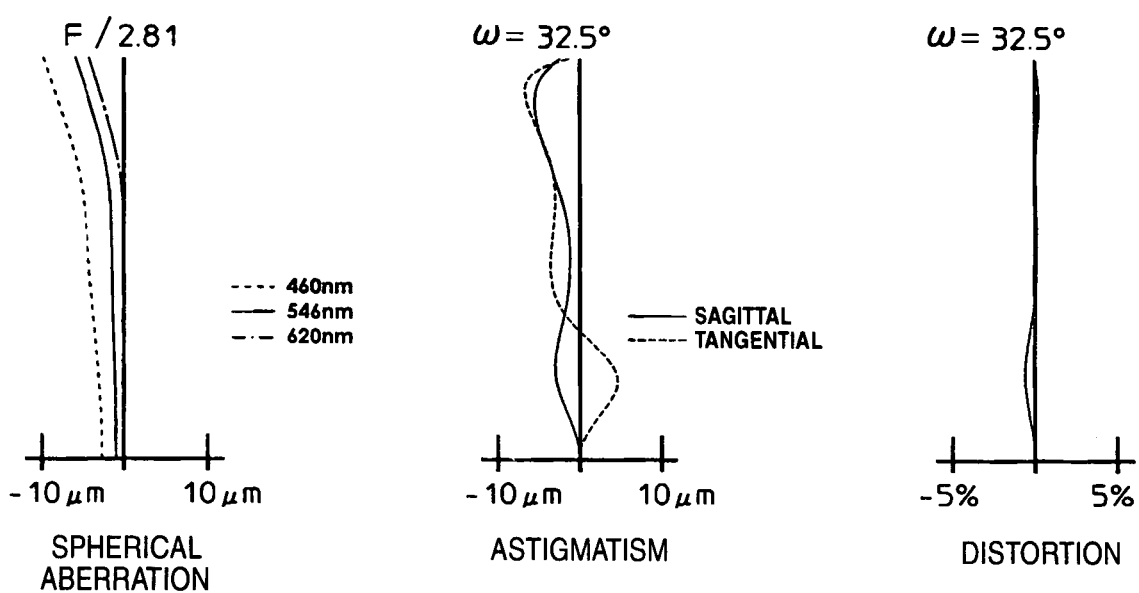
FIG. 2 is an aberration chart showing aberrations (aspheric aberration, astigmatism, and distortion) of the imaging lens according to the first example.

FIG. 2 is an aberration chart showing spherical aberration, astigmatism, and distortion of the imaging lens of the first example. This astigmatism chart shows aberration of a sagittal image surface and aberration of a tangential image surface. In the aberration chart, reference symbol ω designates a half angle of view. As is evident from the aberration chart, the imaging lens of the first example can properly correct aberrations while the overall length of the lens system is reduced.

Figure 3:
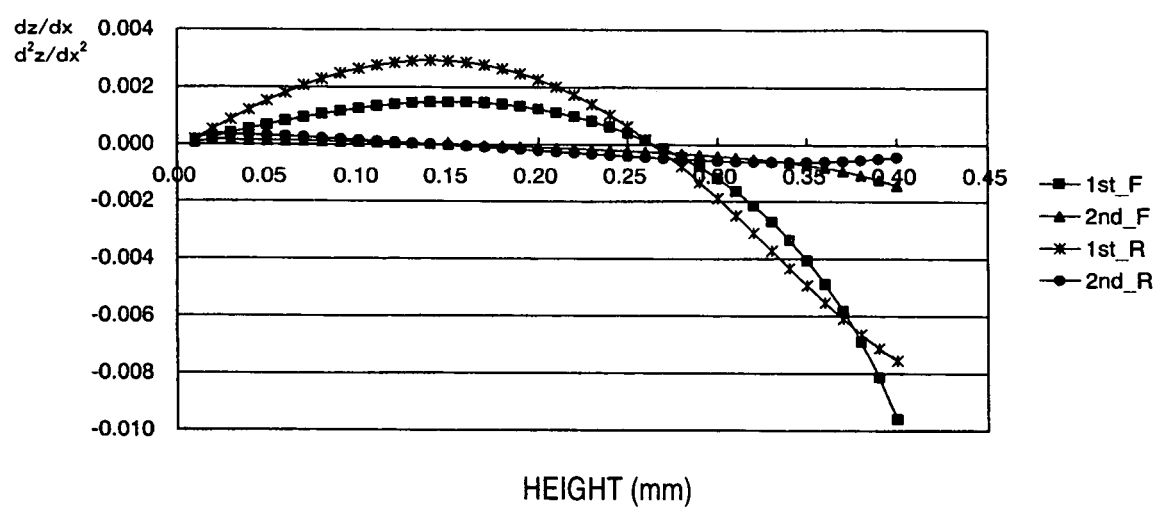
FIG. 3 is a graph showing data pertaining to the shape of an air lens of the imaging lens according to the first example.

FIG. 3 shows curves representing the first and second derivatives, respectively, of the shapes of the front and rear surfaces of the air lens existing between the third lens $L_3$ and the fourth lens $L_4$ in the first example. In FIG. 3, x indicates a radial distance of the lens from the optical axis; z indicates a distance along the optical axis from the point of the intersection between the optical axis and the lens surface (the top of the surface); 1ST_F indicates a value determined by taking first derivate of the shape of the front surface of the air lens (the image-side surface of the third lens $L_3$) (dz/dx); 2nd_F indicates a value determined by taking second derivate of the shape of the front surface of the air lens (the image-side surface of the third lens $L_3$) ($d^2z/dx^2$); 1ST_R indicates a value determined by taking first derivate of the shape of the rear surface of the air lens (the object-side surface of the third lens $L_4$) (dz/dx); and 2nd_R indicates a value determined by taking second derivate of the shape of the rear surface of the air lens (the object-side surface of the third lens $L_4$) ($d^2z/dx^2$). (These have the same meanings in FIGS. 6, 9, 12, 15 and 18.)

SECOND EXAMPLE

Figure 4:
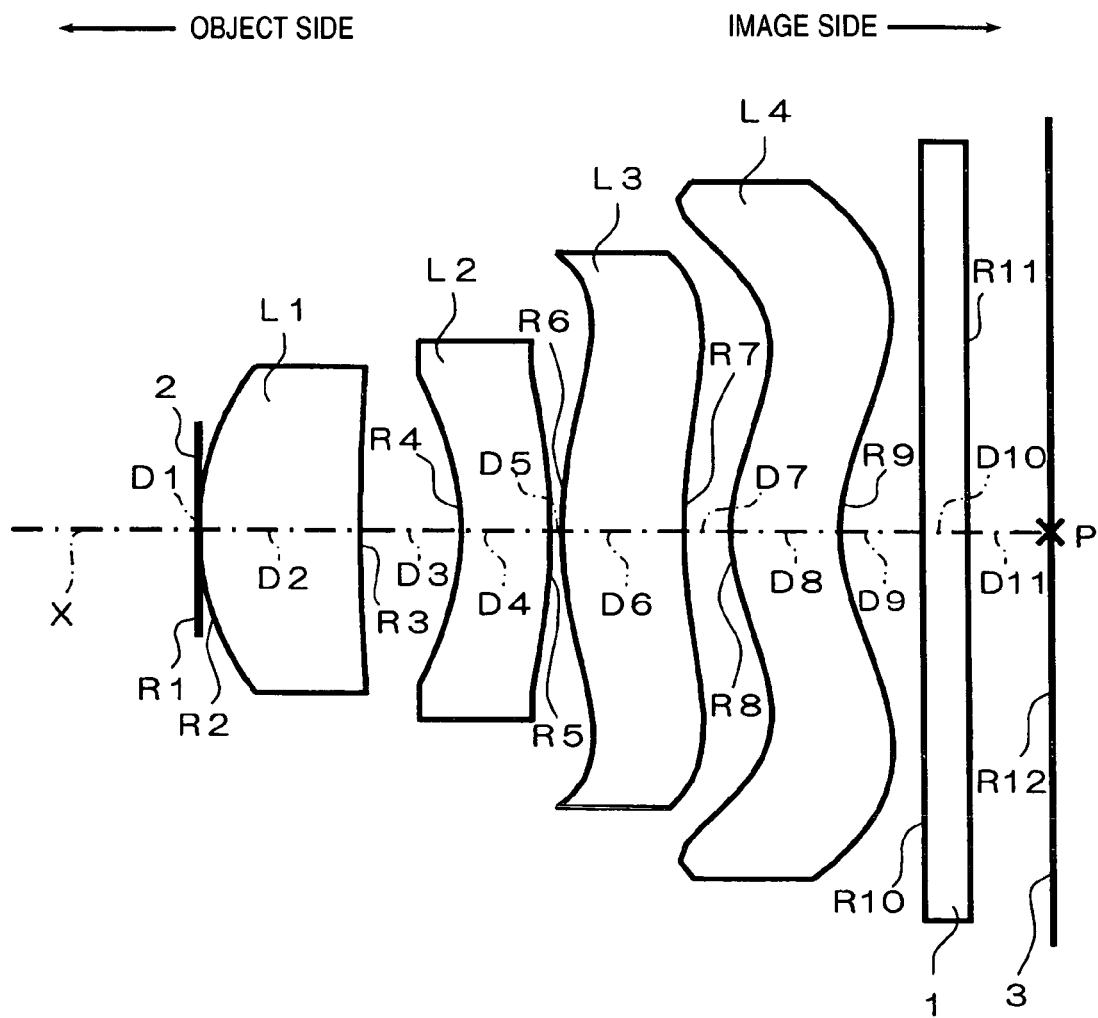
FIG. 4 is a schematic diagram showing the configuration of an imaging lens according to a second example of the present invention.

FIG. 4 shows a schematic configuration of an imaging lens according to a second example. The imaging lens is essentially identical in configuration with the imaging lens of the first example. In the descriptions of corresponding drawings, like elements are assigned like reference numerals, and their repeated explanations are omitted. In this imaging lens, aspheric surfaces are formed on the respective lens surfaces of the second to fourth lenses $L_2$ to $L_4$. Table 3 shows, for each of the imaging lenses, a curvature radius R (mm) of the lens surface, the axial surface separation D (mm), a refractive index N, and an Abbe number ν achieved on each of the lenses along the line "d" thereof. Numerals provided in the table show the sequence of surfaces from the object (the first surface is a diaphragm surface, and the twelfth surface is an imaging surface). In connection with the aspheric surfaces, Table 4 shows constants K, $A_3$, $A_4$, $A_5$, $A_6$, $A_7$, $A_8$, $A_9$, $A_{10}$ of aspheric surfaces provided in the aspheric expression. The focal length "f" of the entire lens system in the second example is set to 1.0 mm.

TABLE 3

|  | SURFACE NO. | R | D | Nd | νd |
|---|---|---|---|---|---|
| STO | 1 | ∞ | 0.00000 | | |
| | 2 | 0.4090 | 0.23958 | 1.496999 | 80.0 |
| | 3 | 3.8957 | 0.14642 | | |
| | *4 | −0.4250 | 0.12883 | 1.602929 | 28.0 |
| | *5 | −0.9853 | 0.01718 | | |
| | *6 | 0.6749 | 0.18062 | 1.508692 | 56.0 |
| | *7 | 0.6680 | 0.06954 | | |
| | *8 | 0.2611 | 0.15696 | 1.508692 | 56.0 |
| | *9 | 0.2666 | 0.12024 | | |
| | 10 | ∞ | 0.06871 | 1.516330 | 64.1 |
| | 11 | ∞ | 0.12299 | | |
| IMG | 12 | ∞ | | | |

*ASPHERIC SURFACE

TABLE 4

| SURFACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 4 | 1.140 | $-3.205 \times 10^{-1}$ | 2.248 | $2.660 \times 10$ | $1.203 \times 10^2$ | $-1.500 \times 10^3$ | $-2.812 \times 10^3$ | $4.838 \times 10^4$ | $-1.000 \times 10^5$ |
| 5 | 4.831 | 1.106 | $-1.941 \times 10$ | $1.141 \times 10^2$ | $-1.068 \times 10^2$ | $-7.577 \times 10^2$ | $2.594 \times 10^2$ | $9.856 \times 10^3$ | $-1.502 \times 10^4$ |
| 6 | −4.349 | $6.387 \times 10^{-1}$ | −4.388 | 4.554 | $4.049 \times 10$ | $-1.722 \times 10^2$ | $-4.079 \times 10^2$ | $2.329 \times 10^3$ | $-2.636 \times 10^3$ |
| 7 | $5.345 \times 10^{-1}$ | −1.976 | 3.103 | 4.213 | $-1.617 \times 10$ | $-1.048 \times 10$ | $7.966 \times 10$ | $5.665 \times 10^2$ | $-8.188 \times 10^2$ |
| 8 | −3.980 | −1.286 | 5.246 | $-1.892 \times 10$ | $-1.498 \times 10$ | $4.478 \times 10$ | $-4.590 \times 10$ | $-1.339 \times 10$ | $2.491 \times 10^2$ |
| 9 | −2.156 | −1.527 | −1.031 | $1.596 \times 10$ | $-3.999 \times 10$ | $-4.442 \times 10$ | $9.926 \times 10$ | $2.076 \times 10^2$ | $-3.142 \times 10^2$ |

The imaging lens of the second example satisfies all the conditional expressions (1) to (6) as shown in Table 13. The overall length of the lens system is assumed to be 1.25 mm.

Figure 5:
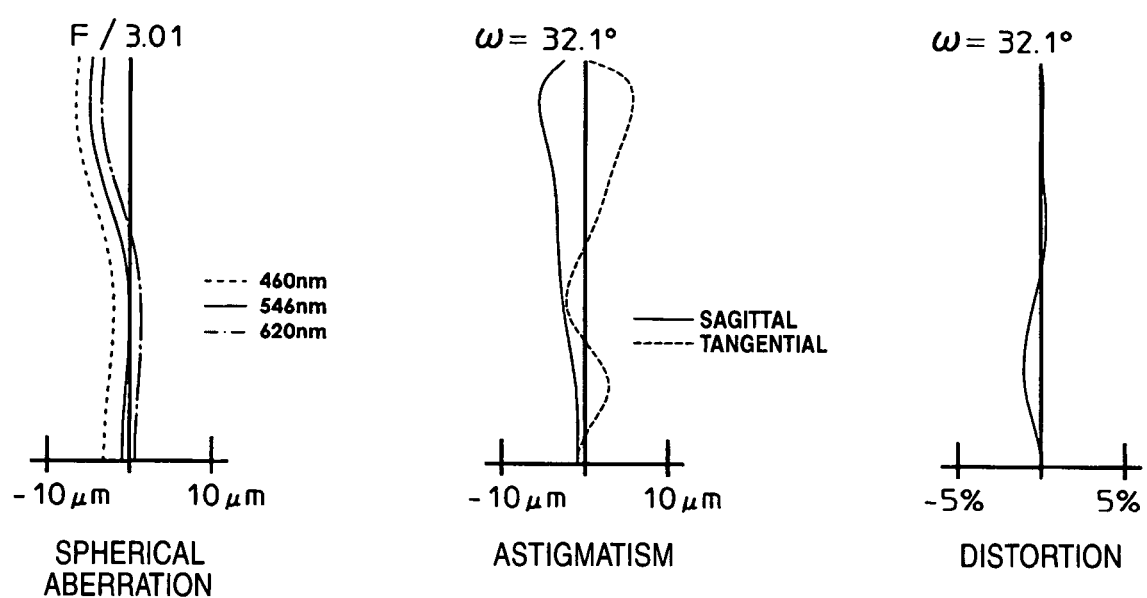
FIG. 5 is an aberration chart showing aberrations (aspheric aberration, astigmatism, and distortion) of the imaging lens according to the second example.

FIG. 5 is an aberration chart showing spherical aberration, astigmatism, and distortion of the imaging lens of the second example. This astigmatism chart shows aberration of a sagittal image surface and aberration of a tangential image surface. In the aberration chart, reference symbol ω designates a half angle of view. As is evident from the aberration chart, the imaging lens of the second example can properly correct aberrations while the overall length of the lens system is reduced.

Figure 6:
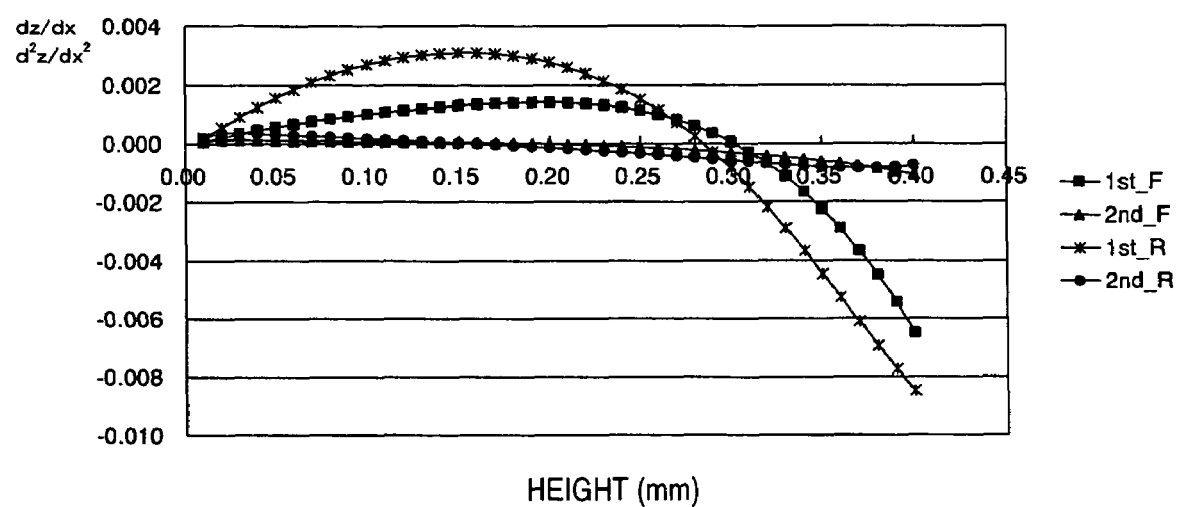
FIG. 6 is a graph showing data pertaining to the shape of an air lens of the imaging lens according to the second example.

FIG. 6 shows curves representing the first and second derivatives, respectively, of the shapes of the front and rear surfaces of the air lens existing between the third lens $L_3$ and the fourth lens $L_4$ in the second example.

THIRD EXAMPLE

Figure 7:
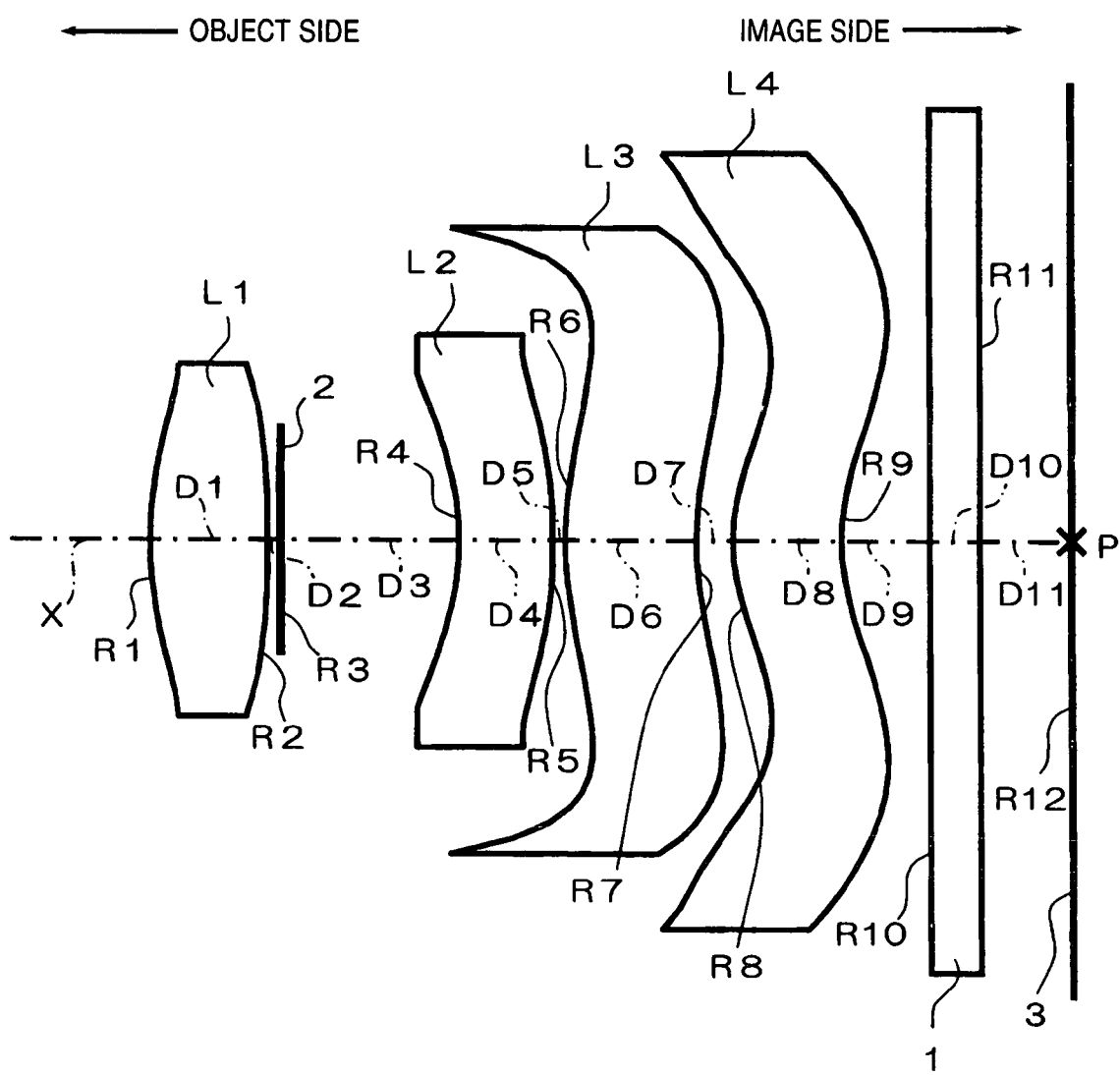
FIG. 7 is a schematic diagram showing the configuration of an imaging lens according to a third example of the present invention.

FIG. 7 shows a schematic configuration of an imaging lens according to a third example. The imaging lens is essentially identical in configuration with that of the first example. In the descriptions of corresponding drawings, like elements are assigned like reference numerals, and their repeated explanations are omitted. The present example differs from the first example in that the first lens L1 is formed as a double convex lens, where a surface having a greater curvature is oriented toward the object and in that the diaphragm 2 is formed as an intermediate diaphragm interposed between the first lens $L_1$ and the second lens $L_2$.

In this imaging lens, aspheric surfaces are formed on the respective lens surfaces of the first to fourth lenses $L_1$ to $L_4$. Table 5 shows, for each of the imaging lenses a curvature radius R (mm) of the lens surface, the axial surface separation D (mm), a refractive index N, and Abbe number ν achieved along the line "d" thereof. Numerals provided in the table show the sequence of surfaces from the object (the third surface is a diaphragm surface, and the twelfth surface is an imaging surface). In connection with the respective aspheric surfaces, Table 6 shows constants K, $A_3$, $A_4$, $A_5$, $A_6$, $A_7$, $A_8$, $A_9$, $A_{10}$ of aspheric surfaces provided in the aspheric expression. The focal length "f" of the entire lens system in the third example is set to 1.0 mm.

TABLE 5

| | SURFACE NO. | R | D | Nd | νd |
|---|---|---|---|---|---|
| | 1 | 0.5371 | 0.16244 | 1.469689 | 78.0 |
| | *2 | −1.8316 | 0.01722 | | |
| STO | 3 | ∞ | 0.24136 | | |
| | *4 | −0.3687 | 0.12928 | 1.608166 | 28.0 |
| | *5 | −0.9144 | 0.01722 | | |
| | *6 | 0.4240 | 0.17937 | 1.510810 | 56.0 |
| | *7 | 0.4216 | 0.05010 | | |
| | *8 | 0.2767 | 0.14684 | 1.510810 | 56.0 |
| | *9 | 0.3235 | 0.12054 | | |
| | 10 | ∞ | 0.06888 | 1.518249 | 64.1 |
| | 11 | ∞ | 0.12192 | | |
| IMG | 12 | ∞ | | | |

*ASPHERIC SURFACE

TABLE 6

| SURFACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 3.213 | $-5.704 \times 10^{-1}$ | 4.783 | $-6.239 \times 10$ | $6.755 \times 10$ | $5.492 \times 10^2$ | $3.605 \times 10^{-2}$ | $-1.919 \times 10^4$ | $3.492 \times 10^4$ |
| 2 | 1.000 | $-2.350 \times 10^{-1}$ | 2.235 | $-4.584 \times 10$ | $1.455 \times 10$ | $1.253 \times 10^3$ | $-8.140 \times 10^2$ | $-4.365 \times 10^4$ | $-1.298 \times 10^5$ |
| 4 | 1.677 | 1.047 | −3.782 | $5.516 \times 10$ | $2.383 \times 10$ | $-7.785 \times 10^2$ | $-1.080 \times 10^3$ | $2.664 \times 10^4$ | $-5.028 \times 10^4$ |
| 5 | 1.021 | $-5.821 \times 10^{-2}$ | $-1.862 \times 10$ | $9.419 \times 10^2$ | $-1.508 \times 10$ | $-6.207 \times 10^2$ | $-1.033 \times 10^2$ | $8.253 \times 10^3$ | $-1.246 \times 10^4$ |
| 6 | −5.977 | −1.913 | 4.037 | 2.363 | −6.904 | $-1.393 \times 10^2$ | $1.933 \times 10$ | $1.637 \times 10^3$ | $-3.258 \times 10^3$ |
| 7 | $6.252 \times 10^{-1}$ | −1.610 | −7.983 | $1.264 \times 10$ | $2.097 \times 10$ | $-1.096 \times 10^2$ | $-2.604 \times 10$ | $3.690 \times 10^2$ | $-4.452 \times 10^2$ |
| 8 | −7.366 | 2.543 | −8.566 | $-2.427 \times 10$ | 2.259 | $7.981 \times 10$ | $1.198 \times 10^2$ | $4.733 \times 10$ | $-4.732 \times 10^2$ |
| 9 | −4.193 | 1.798 | $-1.146 \times 10$ | $1.060 \times 10$ | $-1.295 \times 10$ | −8.499 | $7.231 \times 10$ | $1.067 \times 10^2$ | $-2.586 \times 10^2$ |

The imaging lens of the third example satisfies all the conditional expressions (1) to (7) as shown in Table 13. The overall length of the lens system is assumed to be 1.25 mm.

Figure 8:
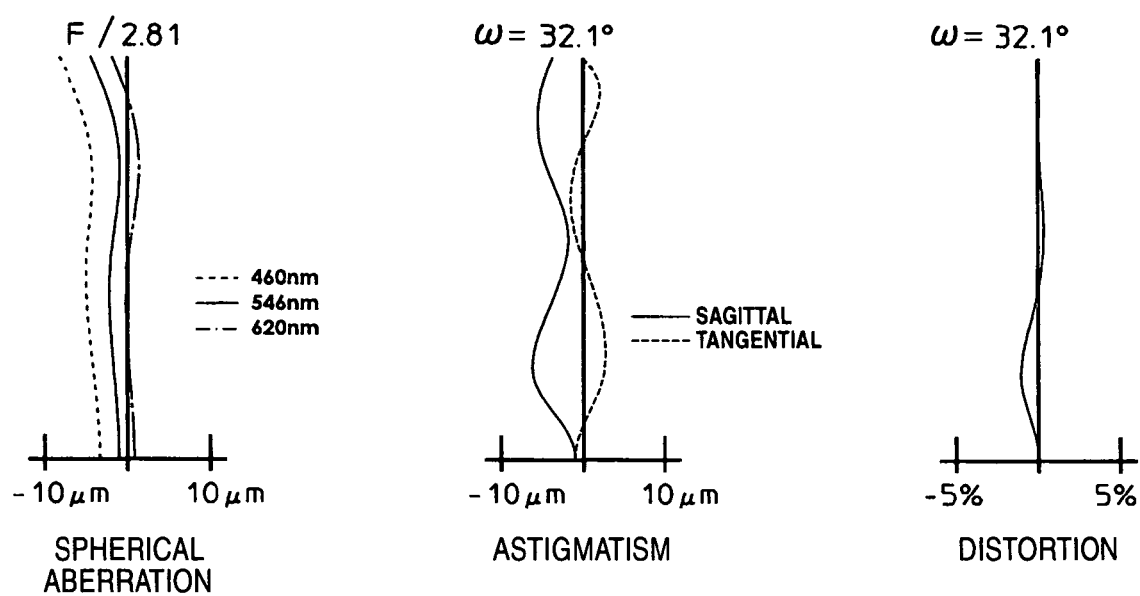
FIG. 8 is an aberration chart showing aberrations (aspheric aberration, astigmatism, and distortion) of the imaging lens according to the third example.

FIG. 8 is an aberration chart showing spherical aberration, astigmatism, and distortion of the imaging lens of the third example. This astigmatism chart shows aberration of a sagittal image surface and aberration of a tangential image surface. In the aberration chart, reference symbol ω designates a half angle of view. As is evident from the aberration chart, the imaging lens of the third example can properly correct aberrations while the overall length of the lens system is reduced.

Figure 9:
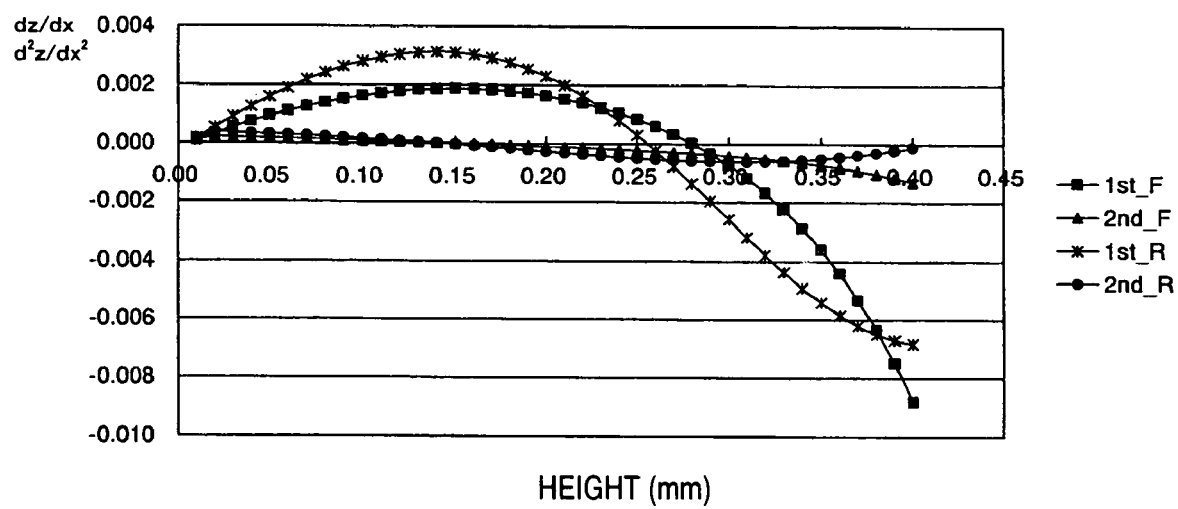
FIG. 9 is a graph showing data pertaining to the shape of an air lens of the imaging lens according to the third example.

FIG. 9 shows curves representing the first and second derivatives, respectively, of the shapes of the front and rear surfaces of the air lens existing between the third lens $L_3$ and the fourth lens $L_4$ in the third example.

FOURTH EXAMPLE

Figure 10:
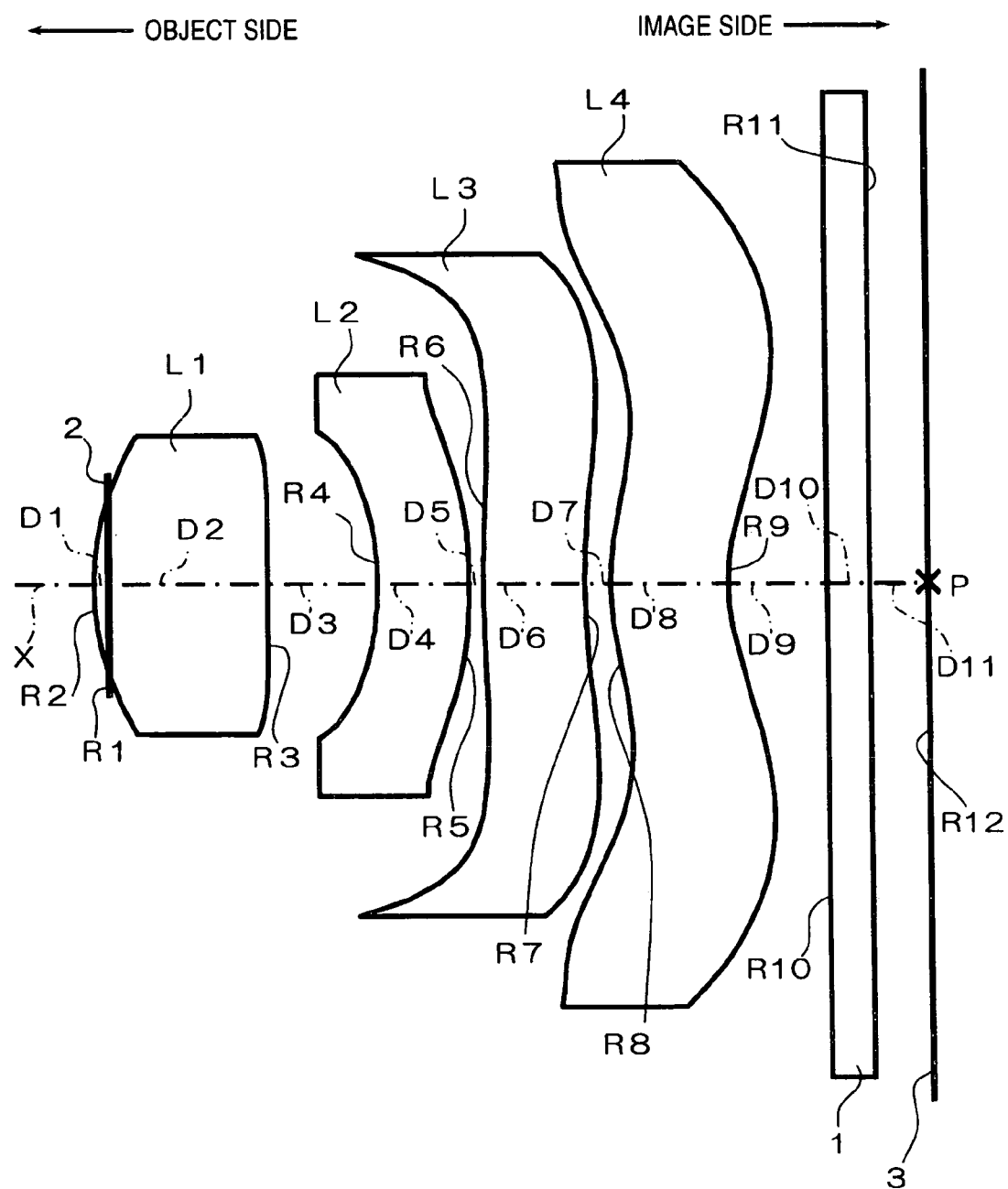
FIG. 10 is a schematic diagram showing the configuration of an imaging lens according to a fourth example of the present invention.

FIG. 10 shows a schematic configuration of an imaging lens according to a fourth example. The imaging lens is essentially identical in configuration with that of the first example. In the descriptions of corresponding drawings, like elements are assigned like reference numerals, and their repeated explanations are omitted. The present example differs from the first example in that the diaphragm 2 is formed in the first lens $L_1$.

In this imaging lens, aspheric surfaces are formed on the respective lens surfaces of the first to fourth lenses $L_1$ to $L_4$. Table 7 shows, for each of the imaging lenses a curvature radius R (mm) of the lens surface, the axial surface separation D (mm), a refractive index N, and Abbe number ν achieved along the line "d" thereof. Numerals provided in the table show the sequence of surfaces from the object (the third surface is a diaphragm surface, and the twelfth surface is an imaging surface). In connection with the respective aspheric surfaces, Table 8 shows constants K, $A_3$, $A_4$, $A_5$, $A_6$, $A_7$, $A_8$, $A_9$, $A_{10}$ of aspheric surface provided in the aspheric expression. The focal length "f" of the entire lens system in the fourth example is set to 1.0 mm.

TABLE 7

| | SURFACE NO. | R | D | Nd | νd |
|---|---|---|---|---|---|
| STO | 1 | ∞ | −0.01948 | | |
| | *2 | 0.3689 | 0.24012 | 1.472819 | 77.6 |
| | *3 | 17.3941 | 0.15241 | | |
| | *4 | −0.4706 | 0.12772 | 1.609211 | 27.2 |
| | *5 | −1.2983 | 0.01948 | | |
| | *6 | 0.7869 | 0.14115 | 1.512221 | 56.2 |
| | *7 | 0.9131 | 0.03576 | | |
| | *8 | 0.3385 | 0.16252 | 1.512221 | 56.2 |
| | *9 | 0.2711 | 0.13636 | | |
| | 10 | ∞ | 0.05844 | 1.518249 | 64.1 |
| | 11 | ∞ | 0.08026 | | |
| IMG | 12 | ∞ | | | |

*ASPHERIC SURFACE

TABLE 8

| SURFACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 2 | 2.484 | $-3.093 \times 10^{-1}$ | $8.787 \times 10^{-1}$ | $-3.478 \times 10$ | $-1.130 \times 10^2$ | $6.121 \times 10^2$ | $7.703 \times 10^2$ | $7.262 \times 10^3$ | $-1.004 \times 10^5$ |
| 3 | $5.268 \times 10$ | $-2.114 \times 10^{-1}$ | −1.004 | $-1.313 \times 10$ | $-3.705 \times 10$ | $4.979 \times 10$ | $-3.777 \times 10^2$ | $-8.922 \times 10^3$ | $1.473 \times 10^4$ |
| 4 | 2.829 | $-8.854 \times 10^{-1}$ | −2.390 | $5.035 \times 10$ | $-3.423 \times 10^2$ | $-9.049 \times 10^2$ | $6.825 \times 10^3$ | $4.181 \times 10^4$ | $-2.553 \times 10^5$ |
| 5 | −2.406 | −3.168 | −9.610 | $7.715 \times 10$ | $1.971 \times 10$ | $-4.057 \times 10^2$ | $-5.050 \times 10^2$ | $1.190 \times 10^3$ | $-2.118 \times 10^3$ |
| 6 | $-4.893 \times 10$ | −2.926 | 8.618 | 4.731 | $-2.825 \times 10$ | $-1.298 \times 10^2$ | $1.042 \times 10^2$ | $1.190 \times 10^3$ | $-2.118 \times 10^3$ |
| 7 | $-1.182 \times 10$ | $-2.621 \times 10^{-1}$ | −1.406 | −2.610 | 2.505 | −6.349 | 8.808 | $8.264 \times 10$ | $-1.968 \times 10^2$ |
| 8 | $-1.265 \times 10$ | 1.122 | $-1.051 \times 10$ | −1.643 | $1.360 \times 10$ | $4.691 \times 10$ | $-2.425 \times 10$ | $-3.312 \times 10$ | $-2.997 \times 10^2$ |
| 9 | −4.883 | $5.713 \times 10^{-2}$ | −6.687 | $1.347 \times 10$ | $-1.218 \times 10$ | $-1.488 \times 10$ | $3.326 \times 10$ | $2.724 \times 10$ | $-5.623 \times 10$ |

The imaging lens of the fourth example satisfies all the conditional expressions (1) to (3), (5) and (6) as shown in Table 13. The overall length of the lens system is assumed to be 1.15 mm.

Figure 11:
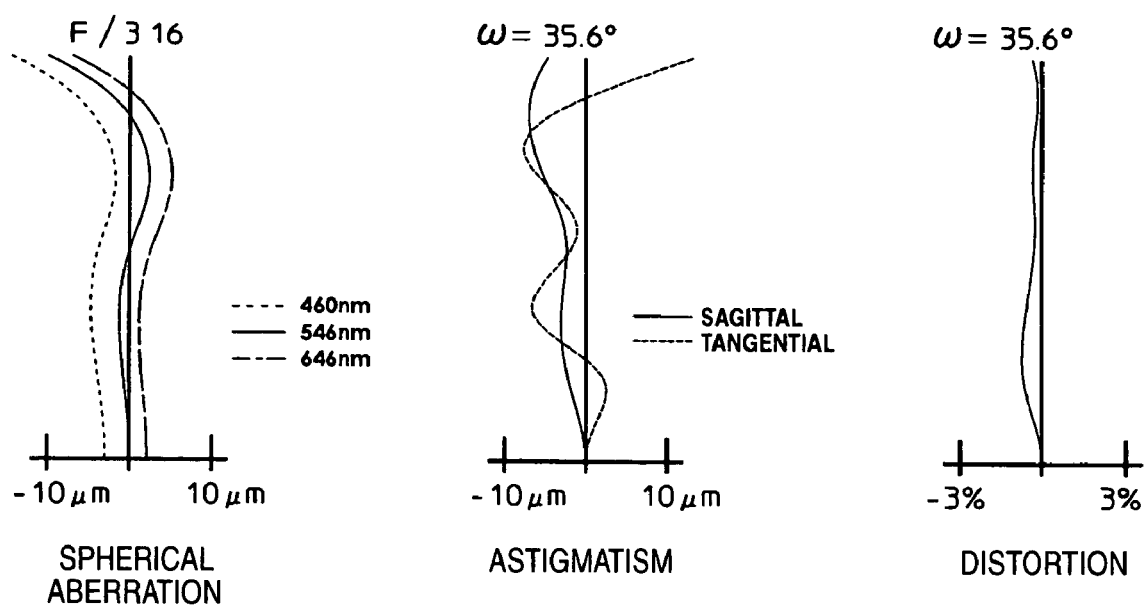
FIG. 11 is an aberration chart showing aberrations (aspheric aberration, astigmatism, and distortion) of the imaging lens according to the fourth example.

FIG. 11 is an aberration chart showing spherical aberration, astigmatism, and distortion of the imaging lens of the fourth example. This astigmatism chart shows aberration of a sagittal image surface and aberration of a tangential image surface. In the aberration chart, reference symbol ω designates a half angle of view. As is evident from the aberration chart, the imaging lens of the fourth example can properly correct aberrations while the overall length of the lens system is reduced.

Figure 12:
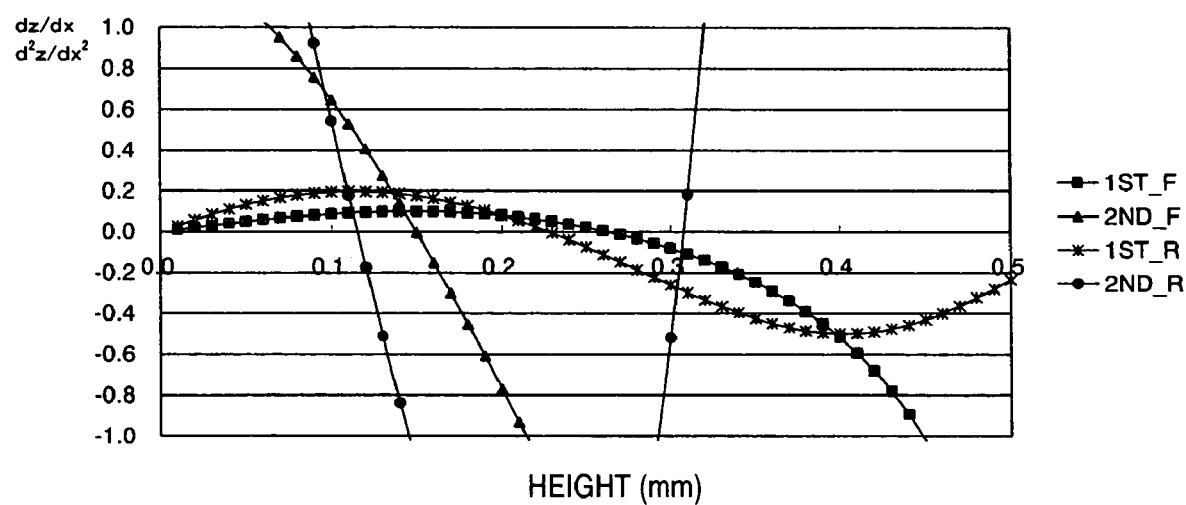
FIG. 12 is a graph showing data pertaining to the shape of an air lens of the imaging lens according to the fourth example.

FIG. 12 shows curves representing the first and second derivatives, respectively, of the shapes of the front and rear surfaces of the air lens existing between the third lens $L_3$ and the fourth lens $L_4$ in the fourth example.

FIFTH EXAMPLE

Figure 13:
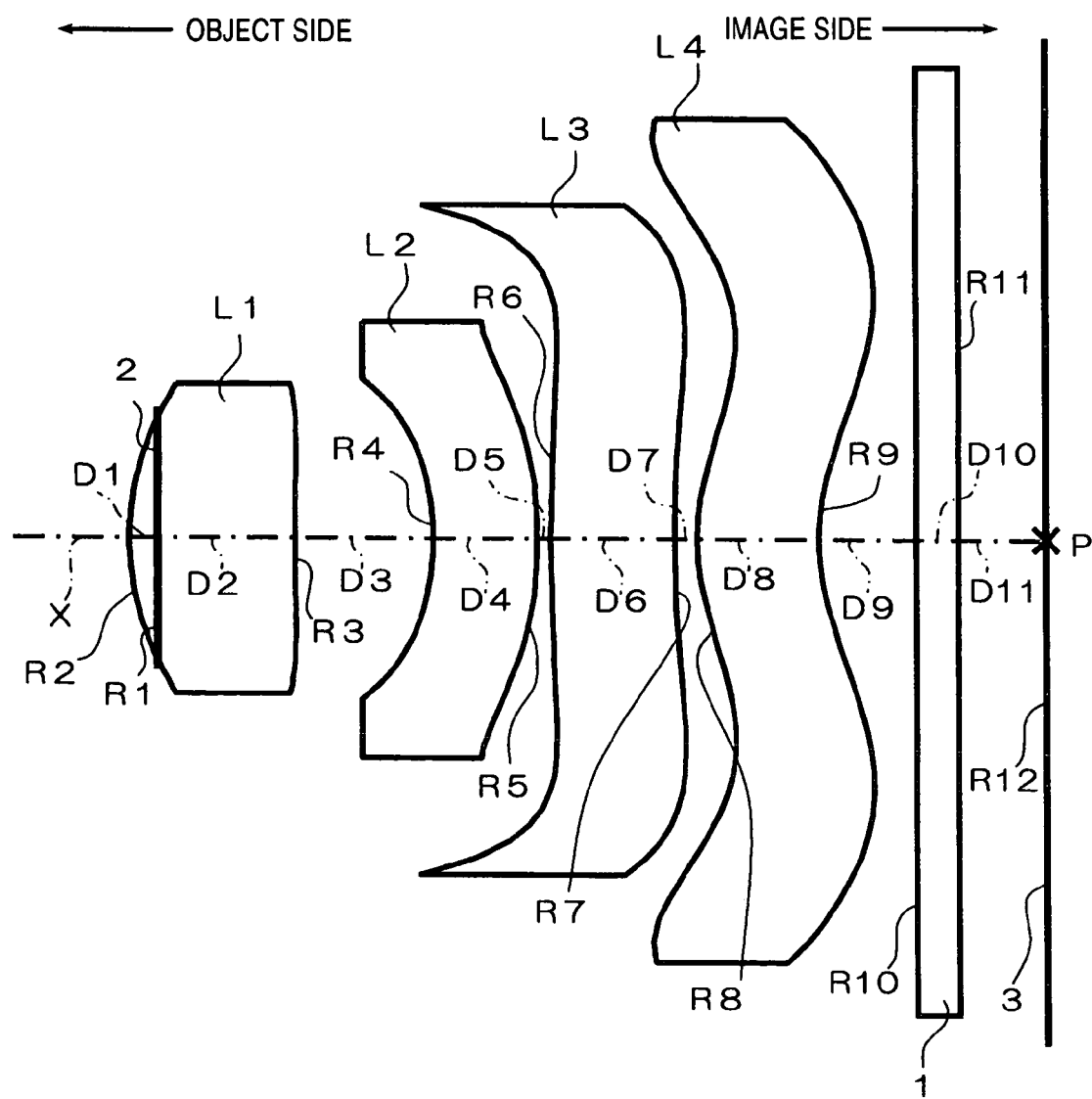
FIG. 13 is a schematic diagram showing the configuration of an imaging lens according to a fifth example of the present invention.

FIG. 13 shows a schematic configuration of an imaging lens according to a fifth example. The imaging lens is essentially identical in configuration with that of the fourth example. In the descriptions of corresponding drawings, like elements are assigned like reference numerals, and their repeated explanations are omitted. The present example is identical to the first example in that the diaphragm 2 is formed in the first lens $L_1$.

In this imaging lens, aspheric surfaces are formed on the respective lens surfaces of the first to fourth lenses $L_1$ to $L_4$. Table 9 shows, for each of the imaging lenses a curvature radius R (mm) of the lens surface, the axial surface separation D (mm), a refractive index N, and Abbe number ν achieved along the line "d" thereof. Numerals provided in the table show the sequence of surfaces from the object (the third surface is a diaphragm surface, and the twelfth surface is an imaging surface). In connection with the respective aspheric surfaces, Table 10 shows constants K, $A_3$, $A_4$, $A_5$, $A_6$, $A_7$, $A_8$, $A_9$, $A_{10}$ of aspheric surfaces provided in the aspheric expression. The focal length "f" of the entire lens system in the fifth example is set to 1.0 mm.

TABLE 9

| | SURFACE NO. | R | D | Nd | νd |
|---|---|---|---|---|---|
| STO | 1 | ∞ | −0.03598 | | |
| | *2 | 0.3539 | 0.21440 | 1.472819 | 77.6 |
| | *3 | 5.0596 | 0.17418 | | |
| | *4 | −0.3890 | 0.13492 | 1.608166 | 27.2 |
| | *5 | −1.1267 | 0.01799 | | |
| | *6 | 1.0634 | 0.15986 | 1.512221 | 56.2 |
| | *7 | 1.7431 | 0.02873 | | |
| | *8 | 0.2988 | 0.15354 | 1.512221 | 56.2 |

TABLE 9-continued

| | SURFACE NO. | R | D | Nd | νd |
|---|---|---|---|---|---|
| | *9 | 0.2761 | 0.12592 | | |
| | 10 | ∞ | 0.05397 | 1.518249 | 64.1 |
| | 11 | ∞ | 0.11244 | | |
| IMG | 12 | ∞ | | | |

*ASPHERIC SURFACE

TABLE 10

| SURFACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 2 | 2.153 | $-5.606 \times 10^{-1}$ | 4.206 | $-4.896 \times 10$ | 3.602 | $2.312 \times 10^2$ | $7.067 \times 10^2$ | $-6.655 \times 10^3$ | $-1.889 \times 10^4$ |
| 3 | $4.018 \times 10$ | $-4.565 \times 10^{-2}$ | $-2.447$ | $-5.303$ | 3.506 | $2.075 \times 10^2$ | $-8.900 \times 10^2$ | $-2.164 \times 10^4$ | $5.896 \times 10^4$ |
| 4 | 2.105 | $-1.237$ | $-4.509$ | $4.857 \times 10$ | $-2.315 \times 10^2$ | $-8.401 \times 10^2$ | $5.243 \times 10^3$ | $4.313 \times 10^4$ | $-2.385 \times 10^5$ |
| 5 | 3.382 | $-3.536$ | $-1.346 \times 10$ | $1.045 \times 10^2$ | $3.272 \times 10$ | $-6.658 \times 10^2$ | $-9.728 \times 10^2$ | $3.735 \times 10^3$ | $5.179 \times 10^3$ |
| 6 | $-2.211 \times 10^2$ | $-2.391$ | $1.205 \times 10$ | 4.960 | $-5.283 \times 10$ | $-2.161 \times 10^2$ | $1.138 \times 10^2$ | $2.322 \times 10^3$ | $-3.828 \times 10^3$ |
| 7 | $9.331 \times 10^{-1}$ | $1.034 \times 10^{-1}$ | $-4.373 \times 10^{-1}$ | $-3.410$ | $-1.294$ | $-2.037 \times 10$ | $-2.455 \times 10$ | $2.610 \times 10^2$ | $-3.958 \times 10^2$ |
| 8 | $-7.617$ | 2.285 | $-1.199 \times 10$ | $-5.598$ | $1.273 \times 10$ | $6.217 \times 10$ | $-5.038 \times 10$ | $-4.803 \times 10$ | $4.845 \times 10$ |
| 9 | $-2.707$ | $7.338 \times 10^{-2}$ | $-7.828$ | $1.566 \times 10$ | $-1.849 \times 10$ | $-2.064 \times 10$ | $6.325 \times 10$ | $5.778 \times 10$ | $-1.331 \times 10$ |

The imaging lens of the fifth example satisfies all the conditional expressions (1) to (3), (5) and (6) as shown in Table 13. The overall length of the lens system is assumed to be 1.15 mm.

Figure 14:
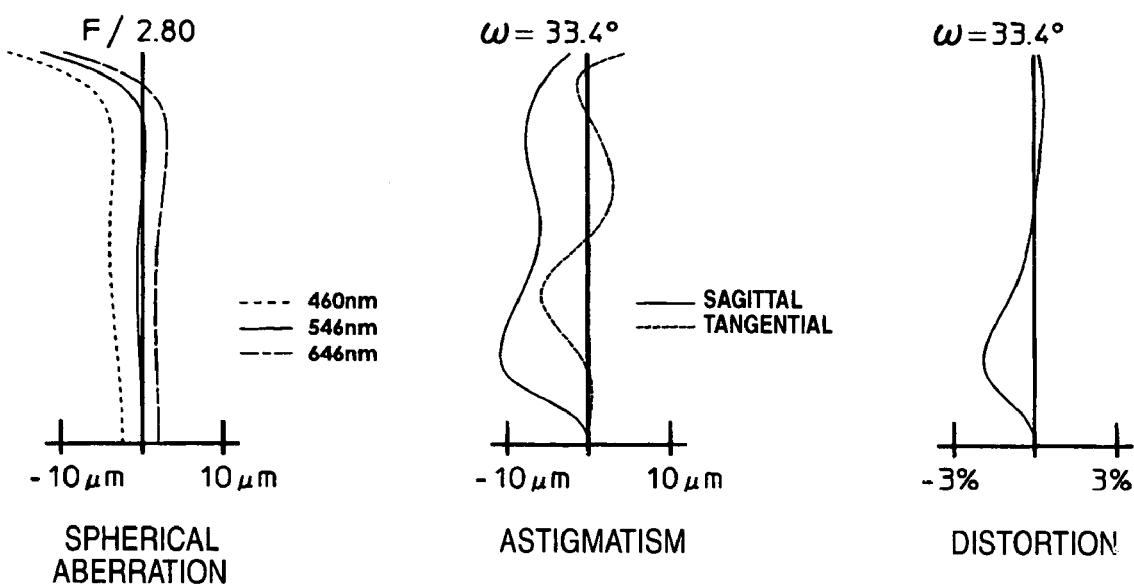
FIG. 14 is an aberration chart showing aberrations (aspheric aberration, astigmatism, and distortion) of the imaging lens according to the fifth example.

FIG. 14 is an aberration chart showing spherical aberration, astigmatism, and distortion of the imaging lens of the fifth example. This astigmatism chart shows aberration of a sagittal image surface and aberration of a tangential image surface. In the aberration chart, reference symbol ω designates a half angle of view. As is evident from the aberration chart, the imaging lens of the fifth example can properly correct aberrations while the overall length of the lens system is reduced.

Figure 15:
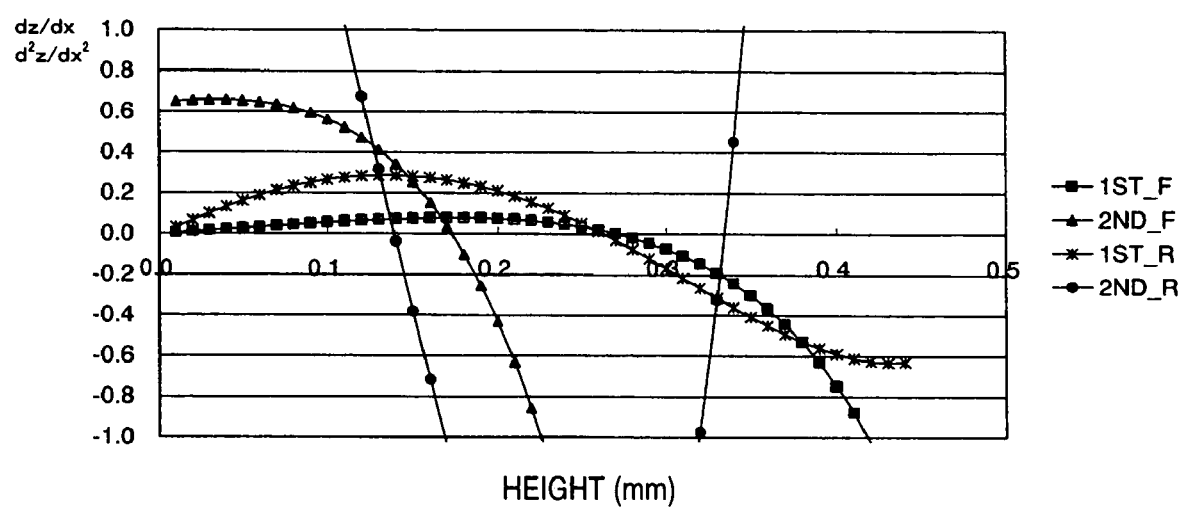
FIG. 15 is a graph showing data pertaining to the shape of an air lens of the imaging lens according to the fifth example.

FIG. 15 shows curves representing the first and second derivatives, respectively, of the shapes of the front and rear surfaces of the air lens existing between the third lens $L_3$ and the fourth lens $L_4$ in the fifth example.

SIXTH EXAMPLE

Figure 16:
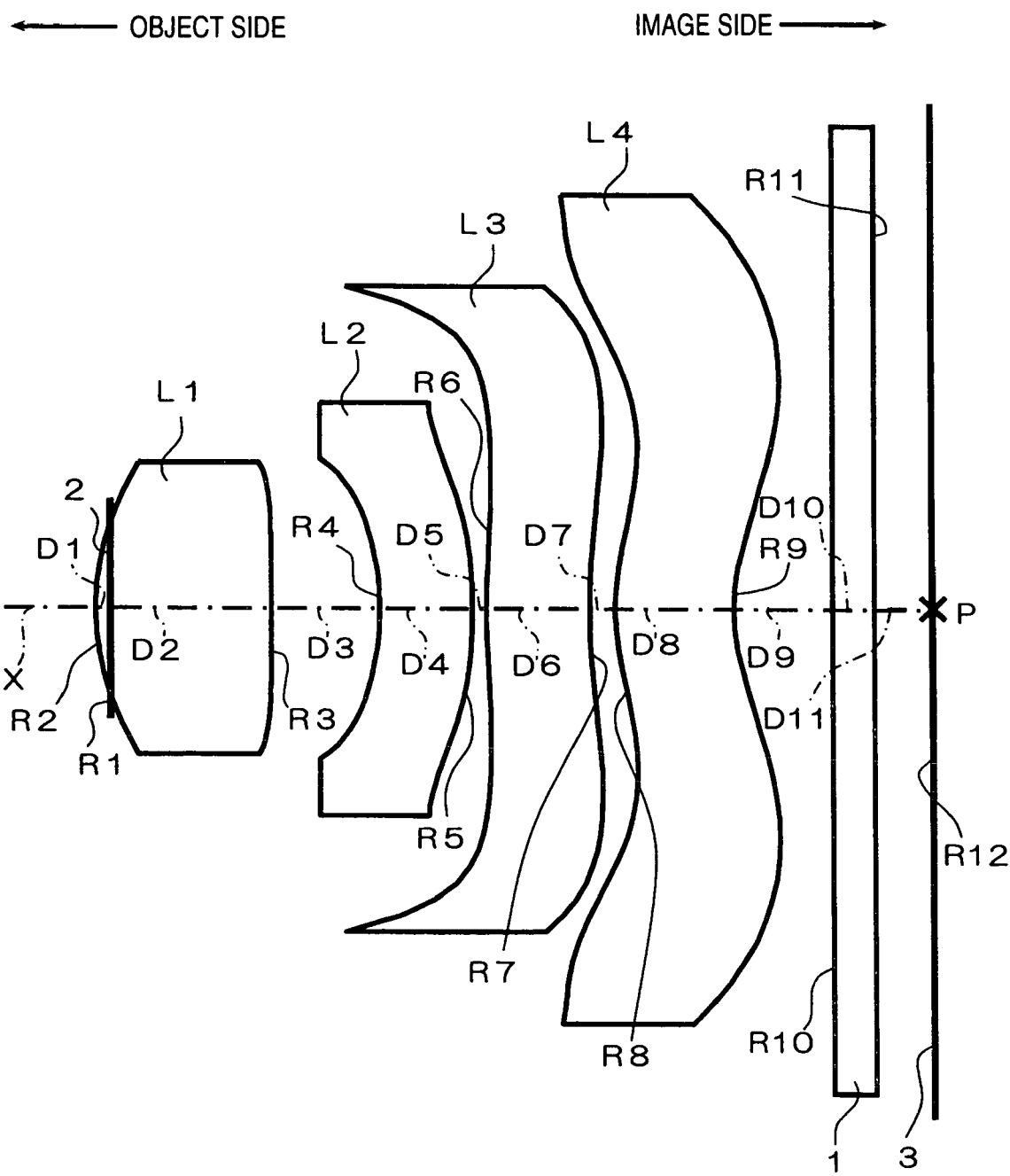
FIG. 16 is a schematic diagram showing the configuration of an imaging lens according to a sixth example of the present invention.

FIG. 16 shows a schematic configuration of an imaging lens according to a sixth example. The imaging lens is essentially identical in configuration with that of the fourth example. In the descriptions of corresponding drawings, like elements are assigned like reference numerals, and their repeated explanations are omitted. The present example is identical to the first example in that the diaphragm 2 is formed in the first lens $L_1$.

In this imaging lens, aspheric surfaces are formed on the respective lens surfaces of the first to fourth lenses $L_1$ to $L_4$. Table 11 shows, for each of the imaging lenses a curvature radius R (mm) of the lens surface, the axial surface separation D (mm), a refractive index N, and Abbe number ν achieved along the line "d" thereof. Numerals provided in the table show the sequence of surfaces from the object (the third surface is a diaphragm surface, and the twelfth surface is an imaging surface). In connection with the respective aspheric surfaces, Table 12 shows constants K, $A_3$, $A_4$, $A_5$, $A_6$, $A_7$, $A_8$, $A_9$, $A_{10}$ of aspheric surfaces provided in the aspheric expression. The focal length "f" of the entire lens system in the sixth example is set to 1.0 mm.

TABLE 11

| SURFACE NO. | R | D | Nd | νd |
|---|---|---|---|---|
| STO | 1 | ∞ | $-0.01953$ | |
| *2 | | 0.37112 | 0.24183 | 1.472819 | 77.6 |
| *3 | | 46.8731 | 0.15155 | | |
| *4 | | $-0.4622$ | 0.12952 | 1.609211 | 27.2 |
| *5 | | $-1.2721$ | 0.01953 | | |
| *6 | | 0.7893 | 0.14191 | 1.512221 | 56.2 |
| *7 | | 0.8858 | 0.03539 | | |
| *8 | | 0.3334 | 0.16353 | 1.512221 | 56.2 |
| *9 | | 0.2761 | 0.13669 | | |
| | 10 | ∞ | 0.05858 | 1.518249 | 64.1 |
| | 11 | ∞ | 0.07975 | | |
| IMG | 12 | ∞ | | | |

*ASPHERIC SURFACE

TABLE 12

| SURFACE NO. | K | $A_3$ | $A_4$ | $A_5$ | $A_6$ | $A_7$ | $A_8$ | $A_9$ | $A_{10}$ |
|---|---|---|---|---|---|---|---|---|---|
| 2 | 2.464 | $-3.188 \times 10^{-1}$ | 1.088 | $-3.459 \times 10$ | $-1.138 \times 10^2$ | $6.059 \times 10^2$ | $8.422 \times 10^2$ | $7.243 \times 10^3$ | $-9.837 \times 10^4$ |
| 3 | $-3.009 \times 10$ | $-1.757 \times 10^{-1}$ | $-1.210$ | $-1.338 \times 10$ | $-3.823 \times 10$ | $4.418 \times 10$ | $-3.716 \times 10^2$ | $-8.748 \times 10^3$ | $1.358 \times 10^4$ |
| 4 | 2.848 | $-8.564 \times 10^{-1}$ | $-2.430$ | $4.928 \times 10$ | $-3.362 \times 10^2$ | $-8.736 \times 10^2$ | $6.747 \times 10^2$ | $4.087 \times 10^4$ | $-2.516 \times 10^5$ |
| 5 | 1.086 | $-3.192$ | $-9.547$ | $7.642 \times 10$ | $1.942 \times 10$ | $-3.999 \times 10^2$ | $-4.942 \times 10^2$ | $2.340 \times 10^3$ | $2.135 \times 10^3$ |
| 6 | $-4.819 \times 10$ | $-2.919$ | 8.205 | 5.027 | $-2.832 \times 10$ | $-1.211 \times 10^2$ | $8.263 \times 10^2$ | $1.187 \times 10^3$ | $-2.144 \times 10^3$ |
| 7 | $-1.130 \times 10$ | $-3.155 \times 10^{-1}$ | $-1.321$ | $-2.566$ | 2.271 | $-6.690$ | 8.322 | $8.097 \times 10$ | $-1.984 \times 10^2$ |
| 8 | $-1.252 \times 10$ | 1.162 | $-1.045 \times 10$ | $-1.764$ | $1.321 \times 10$ | $4.619 \times 10$ | $-2.379 \times 10$ | $-3.205 \times 10$ | $-2.791 \times 10$ |
| 9 | $-5.027$ | $1.758 \times 10^{-1}$ | $-6.826$ | $1.330 \times 10$ | $-1.196 \times 10$ | $-1.459 \times 10$ | $3.340 \times 10$ | $2.642 \times 10$ | $-5.596 \times 10$ |

The imaging lens of the sixth example satisfies all the conditional expressions (1) to (3), (5) and (6) as shown in Table 13. The overall length of the lens system is assumed to be 1.15 mm.

Figure 17:
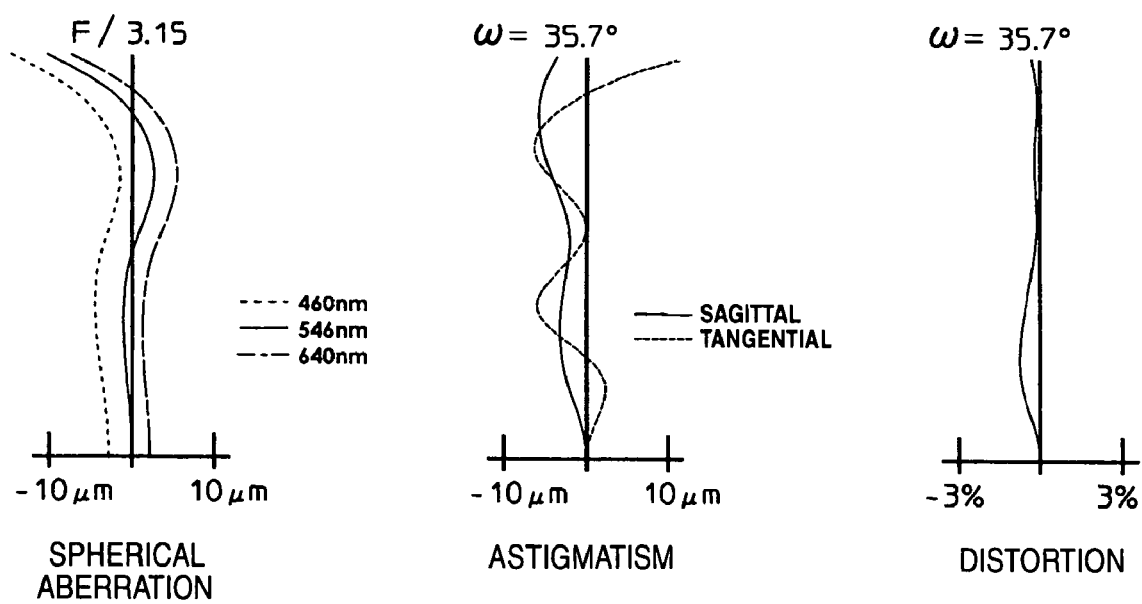
FIG. 17 is an aberration chart showing aberrations (aspheric aberration, astigmatism, and distortion) of the imaging lens according to the sixth example.

FIG. 17 is an aberration chart showing spherical aberration, astigmatism, and distortion of the imaging lens of the sixth example. This astigmatism chart shows aberration of a sagittal image surface and aberration of a tangential image surface. In the aberration chart, reference symbol ω designates a half angle of view. As is evident from the aberration chart, the imaging lens of the sixth example can properly correct aberrations while the overall length of the lens system is reduced.

Figure 18:
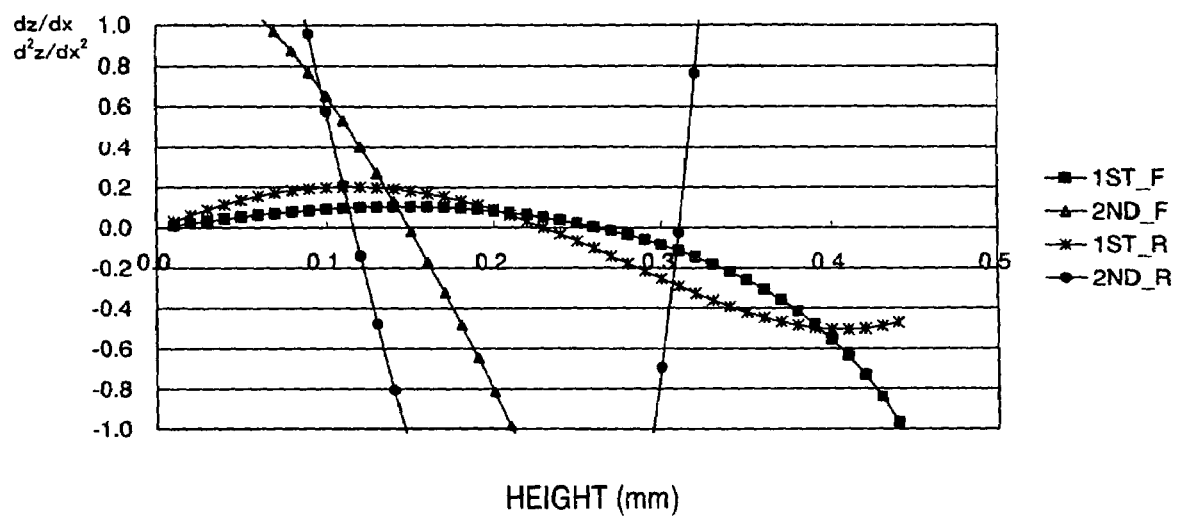
FIG. 18 is a graph showing data pertaining to the shape of an air lens of the imaging lens according to the sixth example.

FIG. 18 shows curves representing the first and second derivatives, respectively, of the shapes of the front and rear surfaces of the air lens existing between the third lens $L_3$ and the fourth lens $L_4$ in the sixth example.

TABLE 13

| | FIRST EXAMPLE | SECOND EXAMPLE | THIRD EXAMPLE | FOURTH EXAMPLE | FIFTH EXAPLE | SIXTH EXAMPLE |
|---|---|---|---|---|---|---|
| $\nu_{d1}$ | 78.0 | 80.0 | 78.0 | 77.6 | 77.6 | 77.6 |
| $\nu_{d2}$ | 28.0 | 28.0 | 28.0 | 27.2 | 27.2 | 27.2 |
| $R_{3R}$ | 0.6129 | 0.6680 | 0.4216 | 0.9131 | 1.7431 | 0.8858 |
| $R_{4F}$ | 0.2826 | 0.2611 | 0.2767 | 0.3385 | 0.2988 | 0.3334 |
| $R_{4R}$ | 0.3040 | 0.2666 | 0.3235 | 0.2711 | 0.2761 | 0.2716 |
| $R_{4F}/F$ | 0.2826 | 0.2611 | 0.2767 | 0.3385 | 0.2988 | 0.3334 |
| $PH_{3R}$ | 0.275 | 0.305 | 0.285 | 0.265 | 0.275 | 0.265 |
| $PH_{4F}$ | 0.265 | 0.285 | 0.255 | 0.225 | 0.265 | 0.235 |
| $DA_{1-2}$ | 0.16540 | 0.14642 | 0.25858 | 0.15241 | 0.17418 | 0.15155 |
| $DT_1$ | 0.20958 | 0.23985 | 0.16224 | 0.24012 | 0.21440 | 0.24183 |
| (1) $R_{3R} > R_{4F} > 0$ | ○ | ○ | ○ | ○ | ○ | ○ |
| (2) $PH_{3R} > PH_{4R}$ | ○ | ○ | ○ | ○ | ○ | ○ |
| (3) $\nu_{d2} < 35$ | ○ | ○ | ○ | ○ | ○ | ○ |
| (4) $0 < R_{4F} < R_{4R}$ | ○ | ○ | ○ | X | X | X |
| (5) $0 < R_{4F}/F < 0.5$ | ○ | ○ | ○ | ○ | ○ | ○ |
| (6) $\nu_{d1} > 65$ | ○ | ○ | ○ | ○ | ○ | ○ |
| (7) $D_{A1-2} > DT_1$ | X | X | ○ | X | X | X |

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-118329 and JP2006-94746, filed Apr. 15, 2005 and Mar. 30, 2006, respectively, the contents of which are incorporated herein by reference.

What is claimed is:

1. An imaging lens comprising, in order from an object side of the imaging lens:
    a first lens of a positive lens;
    a second lens of a negative lens;
    a third lens, both surfaces of which are aspheric surfaces, wherein an image-side surface of the third lens has an extreme point at a position other than an optical axis of the imaging lens; and
    a fourth lens, both surfaces of which are aspheric surfaces, wherein an object-side surface of the fourth lens has an extreme point at a position other than the optical axis,
    wherein
    the imaging lens satisfies Conditional Expressions (1) and (2):

$$R_{3R} > R_{4F} > 0 \quad (1)$$

$$PH_{3R} > PH_{4F} \quad (2)$$

wherein
    $R_{3R}$ represents a radius of curvature at a center of the image-side surface of the third lens;
    $R_{4F}$ represents a radius of curvature at a center of the object-side surface of the fourth lens;
    $PH_{3R}$ represents a distance from the optical axis to the extreme point on the image-side surface of the third lens; and
    $PH_{4F}$ represents a distance from the optical axis to the extreme point on the object-side surface of the fourth lens.

2. The imaging lens according to claim 1, which satisfies Conditional Expression (3):

$$\nu_{d2} < 35 \quad (3)$$

wherein $\nu_{d2}$ represents Abbe number of the second lens.

3. The imaging lens according to claim 1, wherein the second lens is a meniscus lens with a concave surface on an object side thereof.

4. The imaging lens according to claim 1, which satisfies Conditional Expression (4):

$$0 < R_{4F} < R_{4R} \quad (4)$$

wherein R4R represents a radius of curvature at a center of an image-side surface of the fourth lens.

5. The imaging lens according to claim 1, which satisfies Conditional Expression (5):

$$0 < R_{4F}/F 0.5 \quad (5)$$

wherein F represents a focal length of the imaging lens.

6. The imaging lens according to claim 1, which satisfies Conditional Expression (6):

$$\nu_{d1} > 65 \quad (6)$$

wherein $\nu_{d1}$ represents Abbe number of the first lens.

7. The imaging lens according to claim 1, which comprises a diaphragm between the first lens and the second lens, wherein the imaging lens satisfies Conditional Expression (7):

$$D_{A1-2} > D_{T1} \quad (7)$$

wherein
    $DA_{A1-2}$ represents an on-axis air distance between the first lens and the second lens; and
    $D_{T1}$ represents an on-axis thickness of the first lens.

8. The imaging lens according to claim 1, wherein an overall length of the imaging lens can be shortened by controlling an air lens formed between the third and fourth lenses.

9. The imaging lens according to claim 1, wherein the second lens is made of a high-dispersion material.

10. The imaging lens according to claim 1, wherein the third lens is a positive meniscus lens.

11. The imaging lens according to claim 1, wherein the fourth lens is a positive meniscus lens.

12. The imaging lens according to claim 1, wherein the fourth lens is a negative meniscus lens.

13. The imaging lens according to claim 1, wherein both surfaces of the first lens are aspheric.

14. The imaging lens according to claim 1, wherein both surfaces of the second lens are aspheric.

15. The imaging lens according to claim 1, wherein the imaging lens corrects aberrations while the overall length of the imaging lens is reduced.

16. An imaging lens comprising, in order from an object side of the imaging lens:
   a first lens of a positive lens;
   a second lens of a negative lens;
   a third lens, both surfaces of which are aspheric surfaces, wherein an image-side surface of the third lens has an extreme point at a position other than an optical axis of the imaging lens; and
   a fourth lens, both surfaces of which are aspheric surfaces, wherein an object-side surface of the fourth lens has an extreme point at a position other than the optical axis, wherein
   the imaging lens satisfies the conditions:
   $R_{3R} > 0$, and
   $R_{4F} > 0$
   wherein
   $R_{3R}$ represents a radius of curvature at a center of the image-side surface of the third lens, and
   $R_{4F}$ represents a radius of curvature at a center of the object-side surface of the fourth lens.

17. The imaging lens according to claim 16, wherein the imaging lens satisfies Conditional Expression (1): $R_{3R} > R_{4F} > 0$.

18. The imaging lens according to claim 16, wherein the imaging lens satisfies Conditional Expression (2):

$$PH_{3R} > PH_{4F} \quad (2)$$

wherein
   $PH_{3R}$ represents a distance from the optical axis to the extreme point on the image-side surface of the third lens; and
   $PH_{4F}$ represents a distance from the optical axis to the extreme point on the object-side surface of the fourth lens.

19. The imaging lens according to claim 16, which satisfies Conditional Expression (3):

$$\nu_{d2} < 35 \quad (3)$$

wherein $\nu_{d2}$ represents Abbe number of the second lens.

20. The imaging lens according to claim 16, wherein the second lens is a meniscus lens with a concave surface on an object side thereof.

21. The imaging lens according to claim 16, which satisfies Conditional Expression (4):

$$0 < R_{4F} < R_{4R} \quad (4)$$

wherein $R_{4R}$ represents a radius of curvature at a center of an image-side surface of the fourth lens.

22. The imaging lens according to claim 16, which satisfies Conditional Expression (5):

$$0 < R_{4F}/F < 0.5 \quad (5)$$

wherein F represents a focal length of the imaging lens.

23. The imaging lens according to claim 16, which satisfies Conditional Expression (6):

$$\nu_{d1} > 65 \quad (6)$$

wherein $\nu_{d1}$ represents Abbe number of the first lens.

24. The imaging lens according to claim 16, which comprises a diaphragm between the first lens and the second lens, wherein the imaging lens satisfies Conditional Expression (7):

$$D_{A1-2} > D_{T1} \quad (7)$$

wherein
   $D_{A1-2}$ represents an on-axis air distance between the first lens and the second lens; and
   $D_{T1}$ represents an on-axis thickness of the first lens.

25. The imaging lens according to claim 16, wherein the second lens is made of a high-dispersion material.

26. The imaging lens according to claim 16, wherein the third lens is a positive meniscus lens.

27. The imaging lens according to claim 16, wherein the fourth lens is a positive meniscus lens.

28. The imaging lens according to claim 16, wherein the fourth lens is a negative meniscus lens.

29. The imaging lens according to claim 16, wherein both surfaces of the first lens are aspheric.

30. The imaging lens according to claim 16, wherein both surfaces of the second lens are aspheric.

31. The imaging lens according to claim 16, wherein an overall length of the imaging lens can be shortened by controlling an air lens formed between the third and fourth lenses.

* * * * *